United States Patent [19]
Mozer et al.

[11] Patent Number: 6,060,671
[45] Date of Patent: May 9, 2000

[54] ROTARY SWITCH WITH AN INTERMEDIATE BLOCKING DEVICE BETWEEN THE ROTATION STEPS

[75] Inventors: Reiner Mozer, Vaihingen/Enz; Walter Neubauer, Lauffen, both of Germany

[73] Assignee: ITT Manufacturing Enterprises Inc., Wilmington, Del.

[21] Appl. No.: 09/101,462

[22] PCT Filed: Dec. 19, 1996

[86] PCT No.: PCT/EP96/05705

§ 371 Date: Oct. 5, 1998

§ 102(e) Date: Oct. 5, 1998

[87] PCT Pub. No.: WO97/26669

PCT Pub. Date: Jul. 24, 1997

[30] Foreign Application Priority Data

Jan. 20, 1996 [DE] Germany .......................... 196 01 984

[51] Int. Cl.[7] ................................................ H01H 9/28
[52] U.S. Cl. ................................... 200/43.16; 200/61.27; 200/61.28
[58] Field of Search ............................ 200/43.16, 43.18, 200/61.39, 566, 327, 325, 61.27, 61.28

[56] References Cited

U.S. PATENT DOCUMENTS

| | | | |
|---|---|---|---|
| 3,662,618 | 5/1972 | Kroll et al. | 74/527 |
| 4,455,885 | 6/1984 | Beig | 74/477 |
| 5,272,290 | 12/1993 | Suzuki et al. | 200/4 |
| 5,283,403 | 2/1994 | Machalitzky et al. | 200/61.54 |
| 5,430,265 | 7/1995 | Beattie et al. | 200/61.54 |
| 5,665,948 | 9/1997 | Oikawa | 200/61.54 |
| 5,780,794 | 7/1998 | Uchiyama et al. | 200/61.54 |

FOREIGN PATENT DOCUMENTS

| | | |
|---|---|---|
| 2681468 | 3/1993 | France . |
| 2531696 | 3/1977 | Germany . |
| 97/26669 | 7/1997 | WIPO . |

OTHER PUBLICATIONS

German Patent Application No. G8905409.1, filed Aug. 17, 1989.
German Patent Application No. G9206449.3, filed Jan. 27, 1994.
German Patent Application No. 90 403 020.2.
German Patent Application No. 2835256, filed Feb. 14, 1980.

*Primary Examiner*—Michael L. Gellner
*Assistant Examiner*—Nhung Nguyen
*Attorney, Agent, or Firm*—J. Gordon Lewis

[57] ABSTRACT

A rotary switch of the type assembled in steering column switches. In switches of that type it is frequently necessary to safeguard that in small angular switching distances they reliable take the switching positions in which the desired indexing operations take place. The present invention uses a replaceable locking ring which through its equidistantly arranged teeth fixes the possible angular positions of the rotary switch in that at least one tooth of the support, in the different angular positions, respectively engages between the locking teeth. Advantageous developments of the invention are concerned with means to lock the switch against twisting by inadvertence in that a gate valve is to be placed in its unlocking position before the switch can be indexed by one rotating step to the next position.

12 Claims, 2 Drawing Sheets

ROTARY SWITCH WITH AN INTERMEDIATE BLOCKING DEVICE BETWEEN THE ROTATION STEPS

TECHNICAL FIELD

This invention generally relates to electrical switches and more particularly relates to steering column electrical switches.

BACKGROUND OF THE INVENTION

In manually operated electric switches, frequently, it is of importance to prevent switches from being switched on, indexed to the next position or switched in the wrong direction by inadvertence. Various measures are, therefore, taken to prevent an undesirable operation of electric switches. For example, a gear switch has been described in Applicant's Patent Application P 44 39 905.7 wherein a neutral position can be arrested so that an engine gear cannot be clutched or shifted, by inadvertence, from the forward to the rearward direction and vice versa.

Similar problems are also likely to be encountered with manually operated rotary switches in which an actuator can be indexed, by inadvertence, to the next position or rotated in the wrong direction, thereby attaining an undesired switching state. This problem may also be faced with steering column switches wherein a rotary switch actuated by a rotary handle is provided in the actuating lever.

It is the object of the invention to prevent, in a rotary switch of this type, a new switching position from being set by inadvertence.

The invention resides in predetermining the individual rotary positions of the switch by means of suitable locking means. The invention provides a locking ring engaging with the aid of a locking contour, with bias, a conforming locking contour of the support rigidly connected to the casing. The bias can be substantial so that only by intentionally applying substantial force, the next switching step can be performed. Hence, switching or over-switching by inadvertence is not likely to occur. As the locking contour and the conforming contour, preferably, are meshing, the locking contour will first have to be disengaged from the conforming contour in order to enable the next switching step to be taken. The contour can be so selected that the teeth are provided with sloping faces associated to one another which in the event of a rotary movement of the handle automatically result in a disengagement of the locking contour from the conforming contour because the sloping faces of the teeth act as ramps pushing the locking ring out of the conforming contour. However, a rectangular engagement will require a specific disengagement, for example, by longitudinally displacing the handle in order to enable the locking contour to be twisted with respect to the conforming contour.

To limit the number of switching positions (i.e. the number of rotating steps of the rotary switch), the two locking contours associated to one another can be twisted step by step with respect to one another until the stops of locking ring and support rigidly connected to the housing are in abutment with one another.

To attain, in a simple way, the bias desired for automatic engagement, a helical spring, holds the contour of the locking ring in permanent engagement with the conforming contour on the support, wherein - as previously mentioned - due to sloping toothed flanks of the confirming contours, the locking ring through a rotating movement, can be disengaged against the bias so that after exceeding a critical point it automatically locks, under bias, in the next step of the tooth.

The individual teeth of the locking contour can be equidistantly distributed across the front face of a ring which accordingly applies to the conforming contour on the support. The teeth can be of a triangular or sinusoidal configuration unless a rectangular toothing is chosen as previously mentioned.

If it is desired, that the individual rotating steps are to be successively locked by a simple rotating movement and if, in exceptional cases, e.g. in special designs of the switch, the next locking step is to be taken only after a special manipulation, a gate lock is arranged on the support and is axially displaceable and non-rotatable thereon when said support is in a first axial position. The gate lock described therein can thus selectively be assembled in a locking rotary switch if it is to be safeguarded with such a switch that the next step is allowed to be taken only by a special manipulation. Special locking stops can be provided on the locking ring which get into abutment with the gate lock taking a locking position, thereby preventing the locking ring and, hence, the handle from rotating. Also it would be possible for the gate lock itself to engage the tooth flank of the locking ring thereby arresting the same with respect to the support. If the gate valve is to prevent the rotating movement of the handle and, hence, of the locking ring in both rotating directions, the gate lock is moved such that it engages a locking stop on the locking ring from both sides in a fork-type manner, or plunges in a bar-type manner in the interval between two locking stops on the locking ring.

To the extent that the actuating means, i.e. the handle, in the axial direction thereof, is not simultaneously used for permanently switching a sliding contact, a simple axial movement of the actuating means can be adequate to achieve an unlocking position in which the handle can be rotated. Alternatively, it may be advisable, to provide special means, such as an actuating button, on the outer end of the handle, thereby enabling disengagement without operating the handle by displacing the button with respect to the handle longitudinally thereof. To automatically restore the gate lock to its locking position after disengagement and after a new rotating position having been reached, the return movement of the actuating element moves the gate lock into a first axial position. To also avoid disengagement by inadvertence it is suggested, to effect disengagement against the force of a spring in order to prevent the gate lock from automatically getting into its unlocking position by vibratory or the like motion. The locking ring can be of a design such that, through axial displacement of the actuating means, i.e. the handle, it can be placed in its unlocking position in that the actuating means, during its longitudinal displacement, pushes the gate lock in its unlocking position. In this way, the same spring supported on the actuating means to maintain the locking ring in engagement with the conforming contour, at the same time can apply the bias against which the gate lock is to be removed from its locking position. The locking force, hence, is the same force by which the gate lock is actuated.

If the actuating means or the handle is coupled, in the axial direction, to the gate lock, the same helical spring, during release of the handle, will withdraw the gate lock back to its locking position with respect to locking ring.

Frequently, it is desirable that a switch actually suitable for actuating switch contacts by performing a pushing movement in the axial direction be blocked for this type of actuation, or that an axially actuating switch button be prevented from so acting. In such cases, a multifunction switch suitable to switch in the axial rotating direction, is reduced to act as a rotary switch. If desired, a locking element insures that the switch button or the handle is axially displaced in the longitudinal direction, thereby enabling use thereof for actuating contacts in that direction. The locking element can be a simple ring supported on the carrier and being in abutment with suitable faces on the handle or on the actuating button, so that the same can be twisted but not displaced over the front face of the ring.

With the aid of locking contours potential switching positions can be fixed in which the contacts provided can electrically communicate. If only one predetermined switching angle is available for switching functions the said switching angle can be subdivided into individual switching positions by distributing a corresponding number of locking teeth. Accordingly, it is possible with the switch of the invention to take five different switching positions within one switch angle provided, thereby enabling two locking positions in the right-hand rotation and two locking positions in the left-hand rotation to be attained.

DETAILED DESCRIPTION OF THE PREFERRED EMBODIMENTS

Figure 1:
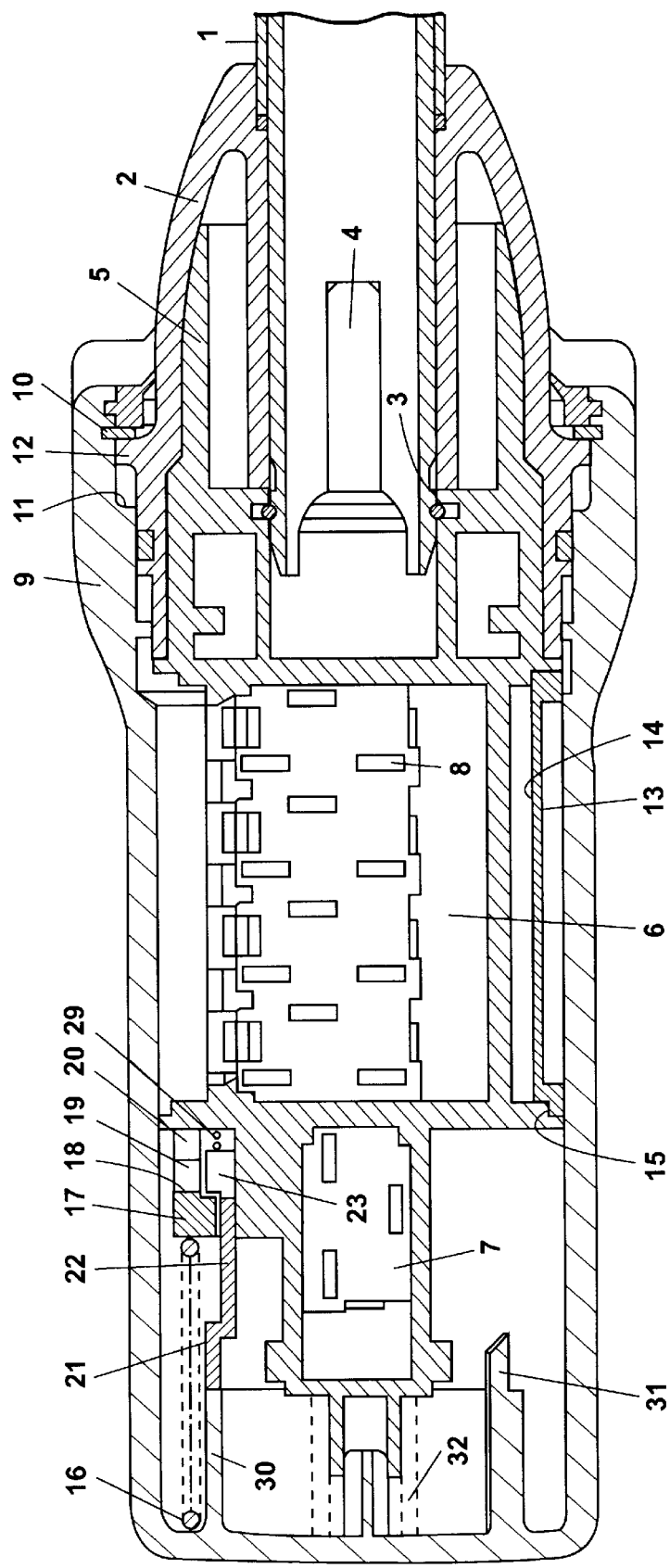
FIG. 1 is a sectional view of the switch in the longitudinal direction.

FIG. 1 shows the end of an actuating lever 1 extending into the switch casing (not shown) of a steering column switch. Concerning the rotary switch explained hereinafter, reference is made to Applicant's patent application Ser. No. 195 28 641.3 describing a comparable design. The present application only refers to those features that differ from the previously described ones.

A substantially annular holder 2 is mounted on the hollow-cylindrical actuating lever 1 to which it is rigidly attached. This can be, for example, by locking via mounting apertures 3,4 provided in the actuating lever.

A support 5 is rigidly connected to the actuating lever 1 and the holder 2 so that actuating lever 1, holder 2 and support 5 form a structural unit. Support 5 includes two bays 6,7 shown in plan view in FIG., 1. Bay 6 is suitable for accommodating four microswitches, while bay 7 is able to accommodate one microswitch in a direction transverse thereto. FIG. 1 reveals opening slots 8, through which can protrude, in the assembled condition of the microswitch (not shown), the plug connections thereof.

Due to the outer contour of the support 5 and of the holder 2, an actuating element 9 designed as a handle is so arranged that it is both rotatable and displaceable with respect to the longitudinal axis thereof, with the displacing distance being predetermined by the locking ring 10 and a step 11 on the actuating element 9, acting against a console of holder 2. The actuating plungers of the microswitches (not shown), from the viewing plane, are facing the viewer and are overarched by an arcuate switch insert 13 along the arcuate inner face 14 of which switch inserts (not shown) extend circumferentially. The actuating element 9 can be axially displaced with respect to the switch insert 13, entraining, however, during an angular movement, the switch insert in the circumferential direction so that due to such a rotating movement the switch insert is guided in a circular arc across the plungers of the microswitches (not shown).

Due to corresponding elevations on the switch contours, the microswitches are thereby switched-through in the accommodating bay 6 in response to the angular position of the switch insert 13, with the angular position of the switch insert 13 being rigidly coupled to the angular position of the actuating element 9 due to the non-rotating connection between switch insert 13 and actuating element. By rotating the handle 9 in an order of sequence predetermined by the contours of the switch insert, the individual microswitches, therefore, can be switched within the bay 6, with 5 different switch positions being provided in the present example of embodiment. A special advantage of the invention resides in that switch angle and switch sequence of the individual microswitches can be easily changed by simply replacing the arcuate switch insert. In addition, the bay 6 can be selectively furnished with microswitches so that it is not required to furnish all points of the two bays 6 and 7 with microswitches.

As conveyed by FIG. 1, a circular sector step 15 associated to which is a corresponding contour in the guiding zone of the support, is provided in the marginal area of the switch insert 13 to the left of FIG. 1. The absence of the circular sector step 15 in the marginal area of the switch insert safeguards that the switch insert 13 can only be inserted on the proper side of the support as the actuating element 9 could otherwise not be pushed over the projecting switch insert 13.

A helical spring 16 provided on the end of handle 9 shown to the left of FIG. 1, forces the handle to the left until the locking ring 10 is in abutment with the console 12. The opposite end of the helical spring 16 acts upon a locking ring 17 disposed within the handle 9 in a non-rotating yet radially displaceable manner, with only the upper half of the said ring 17 being shown in FIG. 1. Equidistantly distributed across two arcuate sections of the circular-arc-shaped front face 18 of the locking ring 17 are axially projecting locking teeth 19 to which are associated corresponding locking teeth 20 on support 5. Hence, the locking teeth 19 form a locking contour 19a to which is associated a conforming contour 20a due to the locking teeth 20. The individual teeth have inclined flanks so that, during a rotating movement of the handle 9, the locking ring 17 can be entrained in the direction of rotation to be disengaged against the force of the helical spring 16 to the left, due to the sloping flanks of the teeth. As soon as the teeth are disengaged, they engage again, staggered by one tooth, during another rotating movement, drawing the rotary lever into the next switching position. In this way, the handle 9, in predetermined steps across the angle of rotation, is locked in its individual indexed positions associated to which through the control cams on the switch insert 13 are the desired through-switch operations of the microswitches.

It is particularly important for the invention that indexing to the next position, during rotation of the presently described rotary switch, can take place only after a special previous locking engagement effected by an annular gate lock 21 including two arrested projections 22 which are axially displaceable but not rotatable on axial rails 23 of support 5. FIG. 1 shows only the upper half of the annular gate lock 21. The handle 9 is coupled to the gate lock 21 in the axial direction, for example, by locking; it is rotatable with respect to the gate lock 21 which itself is not rotatably disposed. In lieu of the axial coupling between gate lock 21 and handle 9 also a helically shaped return spring 29 may be provided.

In this way, in the normal condition, the gate lock 21 in FIG. 1 is displaced to the left by the force of the spring 16 or the force of the spring 29, engaging with its arresting projections 22 between two locking stops 25 of the locking ring 17 (see FIG. 2), thereby preventing the locking ring 17 from being rotated; this applies, accordingly, to the handle in view of the non-rotating connection between locking ring 17 and handle 9. Rotating or indexing to the next position, by inadvertence, hence, is prevented from occurring.

If twisting of the handle is really desired, an axial displacement thereof to the right in FIG. 1 is required, thereby disengaging the arresting projections 22 from the locking stops 25. A displacement in FIG. I to the right for unlocking purposes is caused by displacing the actuating element 9 to the right thereby displacing, with the annular wall 30 thereof, the annular gate lock 21 to the right. In this axial position of the actuating element 9 the same can be indexed by one step or by several steps to the next position, with the locking ring 17 being locked in individual steps across the angle of rotation. FIG. I also shows a switch unit 31 drawn by 90° out of phase, which can be used for actuating the switch plunger of a microswitch seated in the bay 7, which is effected by an axial movement of the handle to the right. If non-rotation through the gate lock 21 is foregone, it will be adequate to omit the same. Moreover, an axial movement of the handle 9 can be prevented, for example, if no axial switching by means of unit 31 is required. In that case, a locking sleeve 32 of the type shown in dashed lines in FIG. 1, can be provided, fixing the handle 9 with respect to the support 5 in the axial direction.

Figure 2:
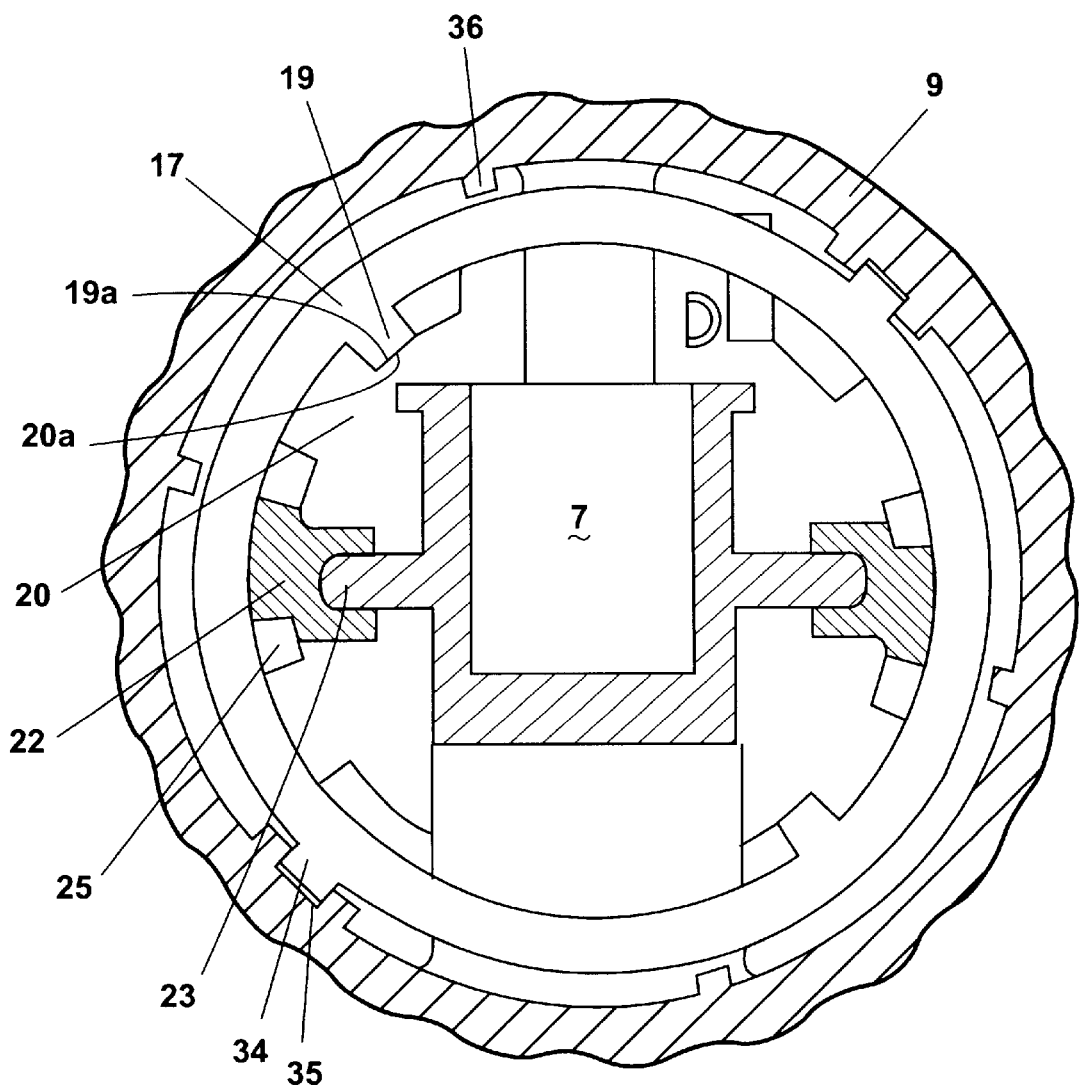
FIG. 2 is a cross-sectional view of the switch according to FIG. 1.

FIG. 2 is a sectional view of the rotary switch at the level of engagement between locking stop 25 and arresting projections 24, with the viewer, in FIG. 2, looking upon the end of handle 9 (FIG. 1 to the left). FIG. 2 reveals the guiding grooves 33 for axially guiding axial projections 34 of the locking ring so that the handle is displaceable but not rotatable over the locking ring. Hence, the handle either is held by the arrested locking ring or otherwise entrains the locking ring in the direction of rotation. Concerning the locking teeth 20 it is possible to provide only one single locking tooth or two symmetrically opposite locking teeth on the support, with the teeth engaging corresponding locking recesses of the locking contour of the locking ring. Below the two locking teeth 20, locking projections can axially protrude from the support across the locking teeth 20, to limit by corresponding stops provided on the locking ring, the angle of rotation generally permitted for the handle. By replacing the locking ring it will be possible to vary not only the number of rotating steps but also the permitted rotary angle.

Through support bridges 36, the surface of the locking ring 17 is additionally supported over the inner face of the handle 9. FIG. 2 shows the handle 9 in a closed condition on an end to the left of the drawing. However, it is also possible to insert the handle described in Application P 44 39 905.7. The said handle permits an actuation of the microswitch located in the bay 24 independently of the axial displacement of the handle so that the micro-switch is actuable with no need to unlock the rotary handle in the direction of rotation.

We claim:

1. An electric switch comprising:
    an actuating element;
    a support for supporting the actuating element;
    a plurality of electric switches disposed within the support and having associated contact pieces, wherein the switches actuate by moving the actuating element along the support in at least a first direction of movement such that the actuating element cooperates with the contact pieces to close at least one of the plurality of electric switches, wherein the actuating element is rotatable with respect to the support about a longitudinal axis of the support and displaceable along the longitudinal axis of the support; and
    a locking ring for fixing a rotating position of the actuating element with respect to the support wherein the ring is arranged in a non-rotating and axially displaceable manner with respect to the actuating element, with the locking ring being axially biased against the actuating element,
    wherein the locking ring has at least one locking tooth forming a locking contour and wherein the support has at least one corresponding locking tooth forming a conforming contour such that the locking contour meshes with the conforming contour.

2. A switch according to claim 1, wherein said at least one locking projection cooperates with said at least one corresponding locking tooth on the support to limit the angle of rotation of the locking ring and, hence, of the actuating element with respect to the support.

3. A switch according to claim 1, wherein the locking ring is prestressed in the axial direction by a helical spring supported on one end by the locking ring and supported on the other end thereof by the actuating element.

4. A switch according to claim 1, further including a gate lock arranged on the support in an axially displaceable manner and non-rotating with respect to the support, wherein said gate lock impedes the rotating movement of the actuating element in a first axial position and wherein said gate lock releases the rotating movement of the actuating element in a second axial position.

5. A switch according to claim 4, wherein the locking ring further comprises at least one locking stop, and wherein the gate lock, in the first axial position, engages at least one arresting projection against at least one locking stop of the locking ring to block the rotating movement thereof.

6. A switch according to claim 5, wherein the gate lock, in the first axial position engages at least one arresting projection between two adjacent locking stops of the locking ring to block the rotating movement thereof in both directions of rotation.

7. A switch according to claim 1, wherein the gate lock is movable from the locking first axial position into an unlocking position by an axial displacement of the actuating element.

8. A switch according to claim 3, further comprising a return spring, wherein the axial displacement of the actuating element is against the force of the helical spring, and wherein the return spring moves the gate lock into its locking first axial position during the return movement of the actuating element to its starting position.

9. A switch according to claim 8, wherein the actuating element, in the axial direction, is coupled while being freely movable in the rotational direction with respect to the gate lock.

10. A switch according to claim 1, further including a switch unit movable in the axial direction independently of the actuating unit to close said electric contacts manually.

11. A switch according to claim 1, further comprising a locking sleeve axially supported on the support, wherein said locking sleeve engages the actuating element to impede the axial displaceability but not the rotatability thereof.

12. A switch according to claim 1, wherein the locking contour of the locking ring and the conforming contour of the support are so provided with tooth-type projections and recesses equidistantly arranged around the locking ring and the support such that the locking contour and the conforming contour can engage in at least five different angular positions.

* * * * *